(12) United States Patent
Schroeder et al.

(10) Patent No.: US 10,882,063 B2
(45) Date of Patent: Jan. 5, 2021

(54) ELECTRO-HYDRAULIC ACTUATED SPRAY GUNS

(71) Applicant: Graco Minnesota Inc., Minneapolis, MN (US)

(72) Inventors: James C. Schroeder, Ramsey, MN (US); Christopher A. Lins, Crystal, MN (US); Steven R. Kuczenski, New Brighton, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 251 days.

(21) Appl. No.: 15/707,569

(22) Filed: Sep. 18, 2017

(65) Prior Publication Data
US 2018/0001333 A1    Jan. 4, 2018

Related U.S. Application Data

(63) Continuation of application No. 14/400,201, filed as application No. PCT/US2013/040386 on May 9, 2013, now Pat. No. 9,764,343.
(Continued)

(51) Int. Cl.
*B05B 9/04* (2006.01)
*E01C 23/22* (2006.01)
(Continued)

(52) U.S. Cl.
CPC .......... *B05B 9/0409* (2013.01); *B05B 1/3026* (2013.01); *B05B 13/005* (2013.01); *E01C 23/22* (2013.01); *F16H 59/0217* (2013.01); *F16H 61/4035* (2013.01); *A63C 2019/067* (2013.01); *B05B 9/0403* (2013.01);
(Continued)

(58) Field of Classification Search
CPC ...... E01C 23/22; E01C 23/222; E01C 23/203; E01C 23/166; E01C 23/0993; E01C 23/227; E01C 23/163; A63C 19/065; A63C 2019/067; Y10T 137/87096; F15B 15/088;
(Continued)

(56) References Cited

U.S. PATENT DOCUMENTS 3,163,360 A    12/1964    McNinch, Jr. et al.
3,477,352 A    11/1969    Harding et al.
(Continued)

FOREIGN PATENT DOCUMENTS

CN    200971469 Y    11/2007
CN    202116970 U    1/2012
(Continued)

OTHER PUBLICATIONS

Examination Report for Australian Patent Application No. 2017268530 dated Feb. 8, 2019, 4 pages.
(Continued)

*Primary Examiner* — Tuongminh N Pham
(74) *Attorney, Agent, or Firm* — Kinney & Lange, P. A.

(57) ABSTRACT

An electro-hydraulic actuation system for a sprayer comprises a hydraulic system, a hydraulic actuator, an electric actuator and a sprayer. The hydraulic system is for pressurizing a hydraulic fluid. The hydraulic actuator is powered by the hydraulic system. The electric actuator controls actuation of the hydraulic actuator by the hydraulic system. The sprayer is actuated by the hydraulic actuator.

18 Claims, 8 Drawing Sheets

Related U.S. Application Data

(60) Provisional application No. 61/645,274, filed on May 10, 2012.

(51) Int. Cl.
| | | |
|---|---|---|
| *B05B 1/30* | (2006.01) | |
| *B05B 13/00* | (2006.01) | |
| *F16H 59/02* | (2006.01) | |
| *F16H 61/4035* | (2010.01) | |
| *A63C 19/06* | (2006.01) | |

(52) U.S. Cl.
CPC .......... *B05B 9/0413* (2013.01); *B05B 9/0423* (2013.01); *B60Y 2200/40* (2013.01)

(58) Field of Classification Search
CPC .. F15B 2015/206; B62D 63/02; B05B 13/005
See application file for complete search history.

(56) References Cited

U.S. PATENT DOCUMENTS

| | | | |
|---|---|---|---|
| 3,576,151 | A | 4/1971 | Sendoykas |
| 3,705,687 | A | 12/1972 | Vicentini et al. |
| 4,236,950 | A | 12/1980 | Eigenmann |
| 4,247,045 | A * | 1/1981 | Mitchell .................. B05B 9/06 239/156 |
| 4,256,261 | A | 3/1981 | Gurney |
| 4,624,602 | A * | 11/1986 | Kieffer .................. E01C 23/22 118/305 |
| 4,684,052 | A | 8/1987 | McDonald et al. |
| 4,684,062 | A | 8/1987 | Bagwell |
| 4,893,751 | A | 1/1990 | Armstrong |
| 5,114,268 | A | 5/1992 | Marcato |
| 5,302,207 | A | 4/1994 | Jurcisin |
| 5,368,232 | A | 11/1994 | Schroeder |
| 5,947,385 | A | 9/1999 | Lanerd et al. |
| 5,984,646 | A | 11/1999 | Renfro et al. |
| 6,062,443 | A | 5/2000 | Smrt |
| 6,413,012 | B1 | 7/2002 | Jones |
| 7,673,815 | B2 | 3/2010 | Schroeder et al. |
| 7,823,752 | B2 | 11/2010 | Riney |
| 8,662,857 | B2 | 3/2014 | Hukriede et al. |
| 2001/0030244 | A1 | 10/2001 | Schroeder et al. |
| 2004/0018053 | A1 | 1/2004 | Starry, Jr. et al. |
| 2004/0189009 | A1 | 9/2004 | Galich |
| 2004/0238661 | A1 | 12/2004 | Schroeder et al. |
| 2006/0005765 | A1 | 1/2006 | Davidson |
| 2007/0090203 | A1 | 4/2007 | Quenzi et al. |
| 2010/0065292 | A1 | 3/2010 | Baker |
| 2010/0266756 | A1 * | 10/2010 | Knutson ............... E01C 23/163 427/137 |
| 2010/0301127 | A1 | 12/2010 | Anderton et al. |
| 2013/0152293 | A1 * | 6/2013 | Yu .......................... F15B 11/08 4/406 |
| 2013/0161357 | A1 | 6/2013 | Verby et al. |

FOREIGN PATENT DOCUMENTS

| | | |
|---|---|---|
| WO | WO2008068583 A1 | 6/2008 |
| WO | WO2008147892 A1 | 12/2008 |

OTHER PUBLICATIONS

International Search Report and Written Opinion for PCT Application PCT/US2013/040386, dated Aug. 19, 2013, 12 Pages.
First Chinese Office Action for CN Application No. 201380024492.1, dated Oct. 12, 2015, 7 Pages.
Second Chinese Office Action for CN Application 201380024492.1, dated Apr. 28, 2016, 12 Pages.
Third Chinese Office Action for CN Application 201380024492.1, dated Sep. 20, 2016, 4 Pages.
Extended European Search Report for EP Application No. 13787214.9, dated Jun. 9, 2016, 6 Pages.
Australian Patent Examination Report No. 1or AU Application No. 2013259463, dated Aug. 23, 2016, 3 Pages.
Australian Patent Examination Report No. 2 for AU Application No. 2013259463, dated Jun. 27, 2017, 3 Pages.
Notice of Acceptance for Patent Application for Australian Patent Application No. 2017268530, dated Jun. 11, 2019, 3 pages.

* cited by examiner

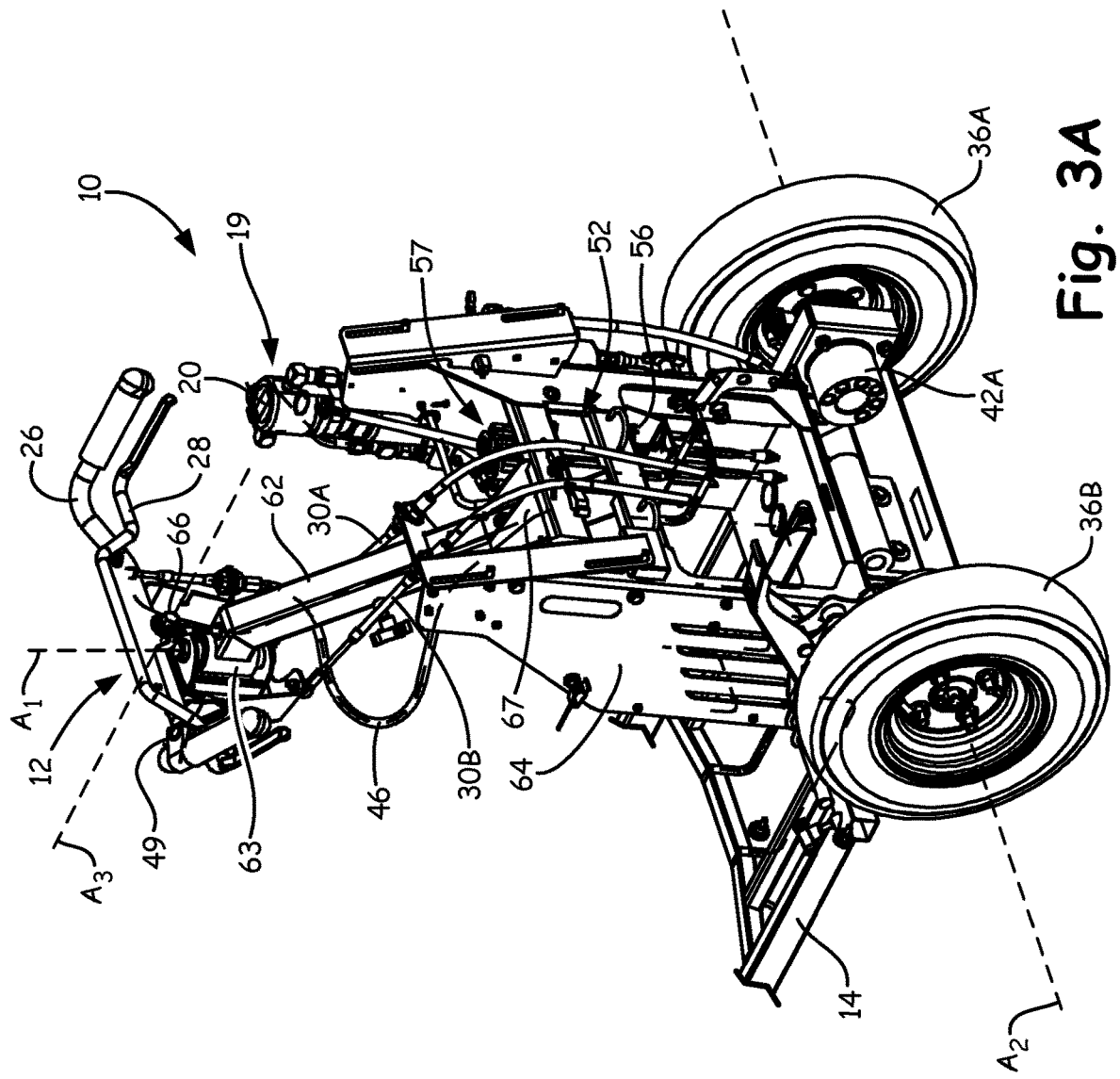

ELECTRO-HYDRAULIC ACTUATED SPRAY GUNS

CROSS-REFERENCE TO RELATED APPLICATION(S)

This application is a continuation of U.S. application Ser. No. 14/400,201 filed Nov. 10, 2014 entitled "ELECTRO-HYDRAULIC ACTUATED SPRAY GUNS" by James C. Schroeder, Christopher A. Lins, and Steven R. Kuczenski, which claims benefit of International Application No. PCT/US2013/040386 filed May 9, 2013, which claims benefit of Provisional Application No. 61/645,274 filed May 10, 2012, which are incorporated herein.

BACKGROUND

The present disclosure relates generally to line striping systems, such as those used for applying painted stripes to roadways and athletic fields. More particularly, the present disclosure relates to activation systems for self-propelled line striping systems.

Line striping systems typically comprise carts that include a gas-operated engine that drives a pump. The pump is fed a liquid, such as paint, from a container disposed on the cart and supplies pressurized fluid to spray nozzles mounted so as to discharge toward the ground. Conventional line striping systems comprise walk-behind carts that are pushed by the operator, who simultaneously operates the spray nozzles with levers mounted to a handlebar for the cart. Such a handlebar typically comprises a fixed pair of handles that are used to orientate swivel-mounted wheels at the front of the cart. These handlebars require the operator to manually actuate the spray nozzles to determine the length of each stripe and the interval between stripes, while physically pushing and turning the entire system.

Line striping carts can be pushed by self-propelled trailers that attach to the rear of the carts, such as at a ball and socket hitch. Each trailer includes a gas-operated engine, separate from the pumping engine, that drives a hydrostatic propulsion system. An operator sits on the trailer and grasps the handlebar of the cart. The hydrostatic propulsion system is typically operated with foot pedals that leave hands of the operator free to manipulate the spray nozzle levers of the cart. In order to facilitate application of straight-line stripes, the front swivel-mounted wheels can be locked to promote straight-line movement of the cart. The pivot-point between the cart and the trailer at the hitch still allows for steering of the system by "wiggling" the cart relative to the trailer. These systems reduce operator fatigue, but still require operator judgment in applying the stripes and are bulky and difficult to maneuver.

Conventional line striping systems utilize compressed air to actuate the spray nozzles. Spray nozzles that utilize compressed air react slowly to activation. Thus, a delay results between the activation and the actual spraying process, which can generate stripes of varying lengths. Additionally, generation of compressed air requires powering of an air compressor that adds weight, cost and complexity to the line striping system.

There is a continuing need to increase the consistency and accuracy of lines produced by the striping system, while at the same time reducing operator fatigue.

SUMMARY

The present disclosure is directed to an electro-hydraulic actuation system for a sprayer, such as those that can be used with self-propelled line stripers. The electro-hydraulic actuation system comprises a hydraulic system, a hydraulic actuator, an electric actuator and a sprayer. The hydraulic system is for pressurizing a hydraulic fluid. The hydraulic actuator is powered by the hydraulic system. The electric actuator controls actuation of the hydraulic actuator by the hydraulic system. The sprayer is actuated by the hydraulic actuator.

BRIEF DESCRIPTION OF THE DRAWINGS

FIGS. 3A and 3B are rear and front perspective views, respectively, of the stand-on line striper of FIGS. 1A and 1B with parts of the hydraulic system and paint system removed to show the electro-hydraulic actuation system.

DETAILED DESCRIPTION

Figure 1A:
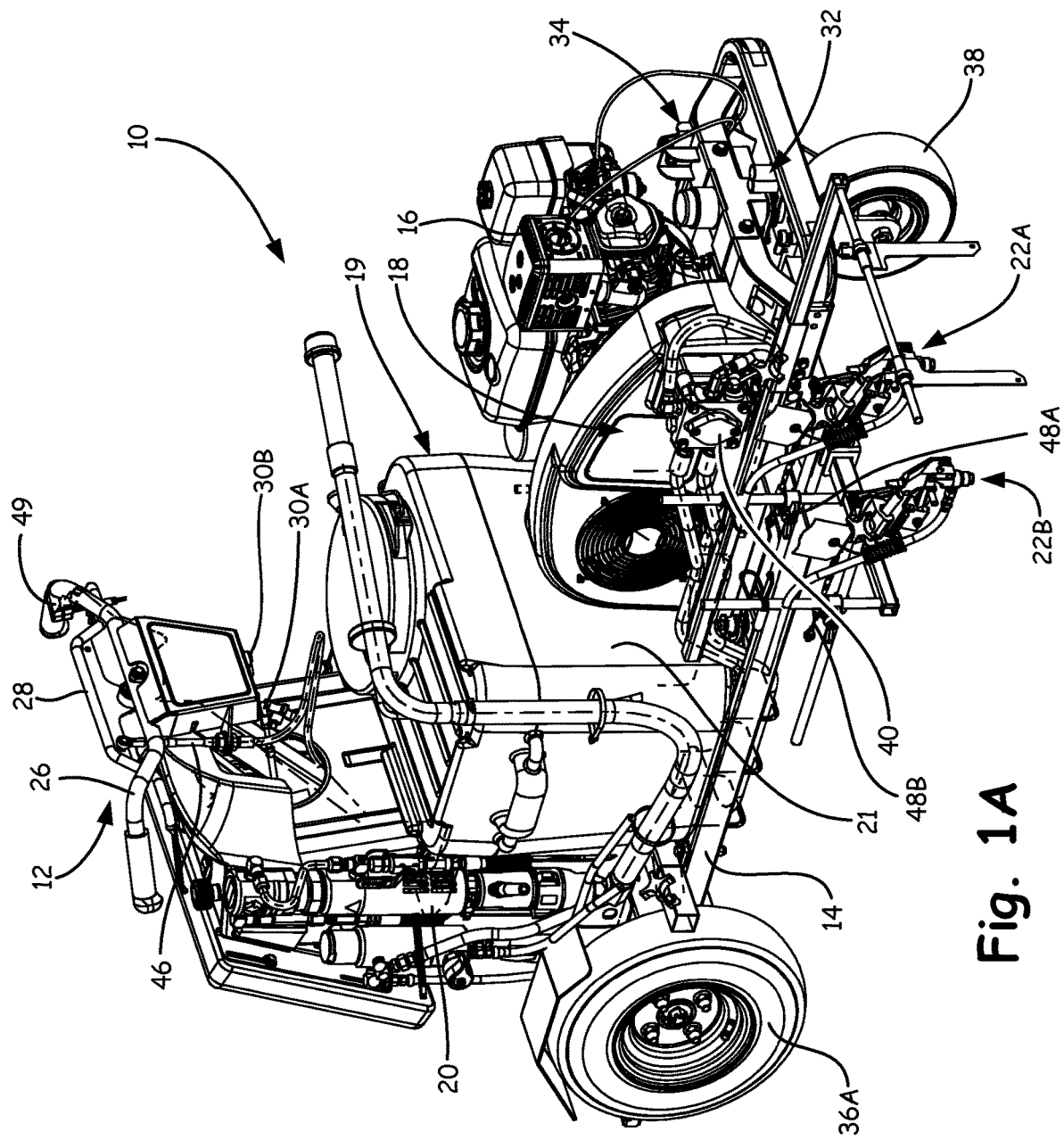
FIG. 1A is a perspective front view of a stand-on line striper in which an electro-hydraulic actuation system of the present disclosure is used.
Figure 1B:
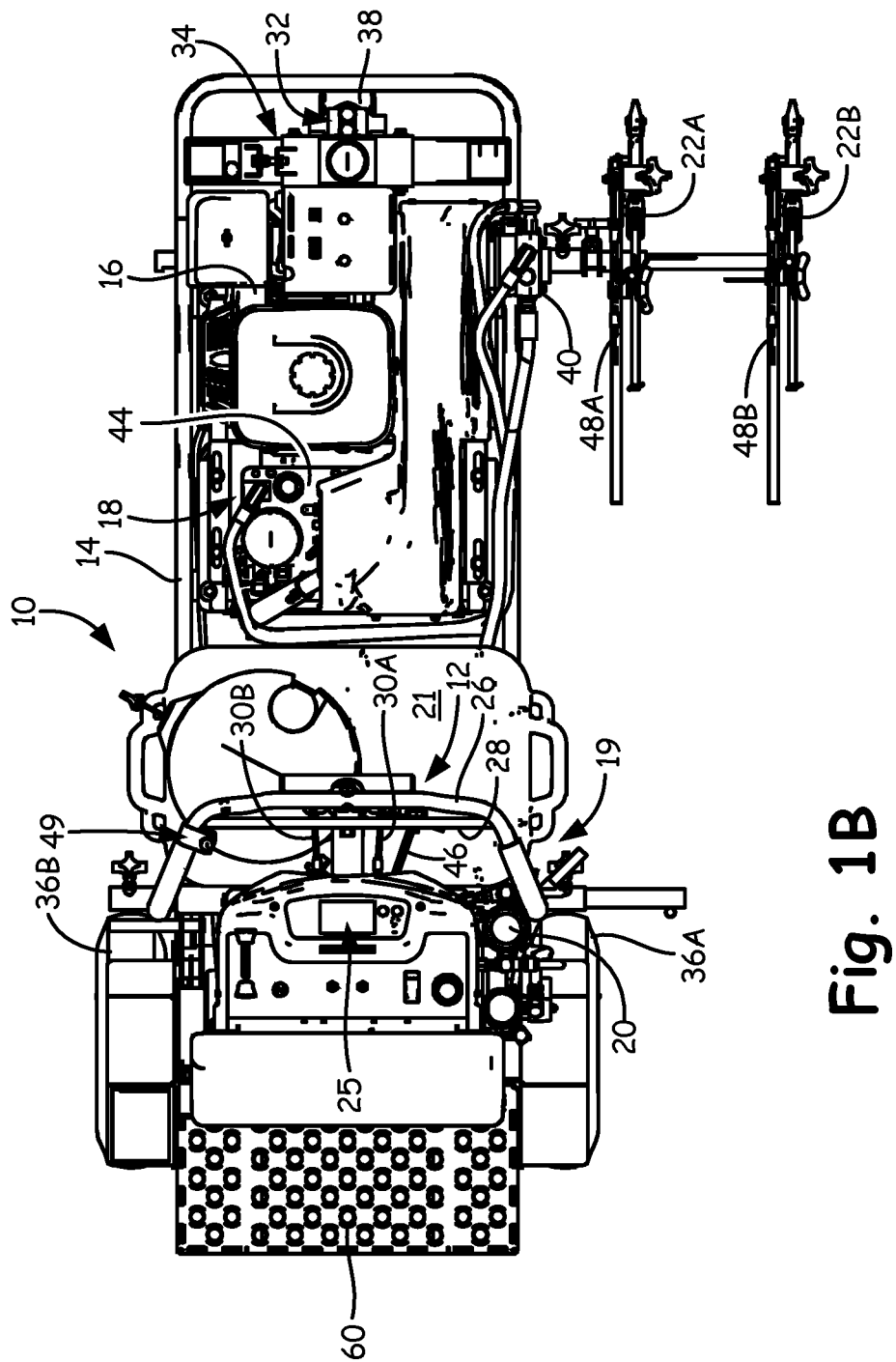
FIG. 1B is a top plan view of the stand-on line striper of FIG. 1A showing a hydraulic system and a paint system used in conjunction with the electro-hydraulic actuation system.

FIG. 1A is a perspective front view of stand-on line striper 10 in which an electro-hydraulic actuation system of the present disclosure is used. FIG. 1B is a top plan view of stand-on line striper 10 of FIG. 1A showing steering system 12, chassis 14, engine 16, hydraulic system 18 and paint system 19. Steering system 12 additionally includes forward and reverse speed controls. Paint system 19 comprises fluid pump 20, fluid container 21, spray guns 22A and 22B, actuators 23 (FIG. 2), solenoids 24 (FIG. 2) and controller 25. Steering system 12 includes handlebar 26, speed bar 28, steering cables 30A and 30B, centering device 32 and alignment system 34. Steering system 12 is coupled to power wheels 36A and 36B (FIG. 1B) and steering wheel 38. Hydraulic system 18 includes pump 40, motor 42 (FIG. 2) and reservoir 44 (FIG. 1B). FIGS. 1A and 1B are discussed concurrently.

Figure 2:
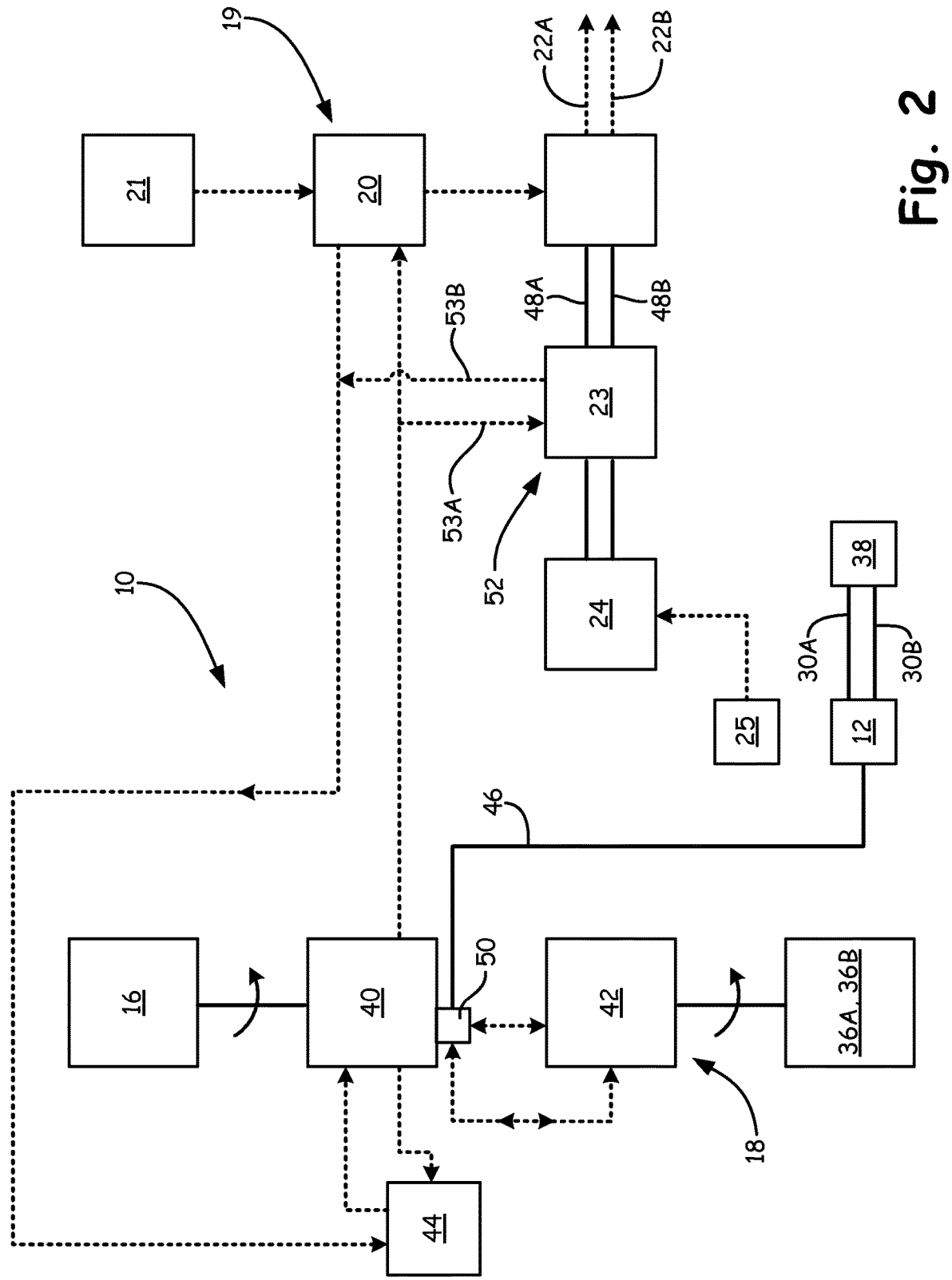
FIG. 2 is a schematic view of the hydraulic system and paint system of the stand-on line striper of FIGS. 1A and 1B interconnected with the electro-hydraulic actuation system.

Power wheels 36A and 36B and steering wheel 38 are mounted to chassis 14 so as to support line striper 10 and allow line striper 10 to roll under power from hydraulic system 18. Power wheels 36A and 36B are coupled to one or more hydraulic motors 42 (FIG. 2) that receive motive fluid power from pump 40, which is driven by engine 16. Via cable 46, speed bar 28 regulates pump 40 to control fluid flow from reservoir 44 (FIG. 1B) to motors 42 (FIG. 2). As such, in one embodiment, hydraulic system 18 operates as a hydrostatic propulsion system.

Steering wheel 38 is connected to handlebar 26 of steering system 12 via cables 30A and 30B to rotate steering wheel 38 relative to chassis 14. Cables 30A and 30B are pushed and pulled by rotation of handlebar 26. Centering device 32 pulls steering wheel 38 to center when handlebar 26 is not subject to rotational force. Alignment system 34 adjusts the position of centering device 32 so as to allow for tuning of steering system 12, such as may be needed to accommodate stretching of cables 30A and 30B or wear of wheel 38.

Engine 16 provides motive power to pump 40 of hydraulic system 18, which drives both wheels 36A and 36B and paint system 19. Fluid pump 20 receives an unpressurized fluid, such as paint, from fluid container 21 and provides pressurized fluid to spray guns 22A and 22B. In one embodiment, fluid pump 20 comprises a hydraulically operated double-acting piston pump. Spray guns 22A and 22B are mechanically operated by hydraulic actuators 23 (FIG. 2) that receive pressurized hydraulic fluid from hydraulic system 18. Hydraulic actuators 23 pull cables 48A and 48B to actuate spray guns 22A and 22B. Hydraulic actuators 23 are powered by solenoids 24 (FIG. 2), which are electronically controlled by controller 25. Hydraulic actuators 23 and solenoids 24 form part of an electro-hydraulic activation system of the present disclosure.

Controller 25 comprises a computer system that is configured to operate spray guns 22A and 22B via solenoids 24 based on operator inputs. For example, stand-on line striper 10 is configured to apply two parallel stripes of fluid from container 21 using spray guns 22A and 22B. Controller 25 controls when either or both of spray guns 22A and 22B are operated so that either one or two stripes are applied. Controller 25 also controls if the stripes are to be continuous or intermittent. If the stripes are to be intermittently applied, as specified by the operator, controller 25 controls the length of each stripe and the interval between stripes by controlling the length of time each spray gun is actuated. An operator of system 10 activates spray guns 22A and 22B with push-button 49 via controller 25, after setting desired parameters (e.g. single stripe, double stripe, stripe length, interval length) at controller 25.

FIG. 2 is a schematic view of hydraulic system 18 and paint system 19 of stand-on line striper 10 of FIGS. 1A and 1B interconnected with steering system 12 and actuation system 52. Hydraulic system 18 and paint system 19 are jointly operated by engine 16. In one embodiment, engine 16 comprises a gas-operated internal combustion engine. Engine 16 provides direct mechanical input to pump 40 via a system of belts and pulleys (not shown). Hydraulic system 18 may, however, include multiple pumps driven by engine 16. For example, a first hydraulic pump may provide input to motors 42, while a second pump may provide input to fluid pump 20, with both pumps operating with fluid from reservoir 44. Pump 40 draws hydraulic fluid from reservoir 44 and provides pressurized fluid directly to pump 20 and to motors 42 via valve 50. Pump 40 and pump 20 return hydraulic fluid directly to reservoir 44, while valve 50 re-circulates fluid to motor 42.

In one embodiment, engine 16, pump 40, motors 42, reservoir 44, wheels 36A and 36B and valve 50 comprise a hydrostatic system, as is known in the art. Although only one motor 42 is shown in FIG. 2, each of power wheels 36A and 36B may be provided with a dedicated motor served by pump 40. For example, power wheel 36A is connected to motor 42A, as shown in FIG. 3A. Motors 42 are configured to provide both forward and aft motive power to wheels 36A and 36B. Specifically, hydraulic system 18 utilizes reversing valve 50 with pump 40, as is known in the art, to reverse the direction of motors 42 by changing the direction of flow through motors 42.

Pump 40 (or another pump within system 18) additionally provides fluid power directly to fluid pump 20, which receives a fluid from container 21. Pump 40 pressurizes the fluid from container 21 and pumps the pressurized fluid to spray guns 22A and 22B. In one embodiment, pump 20 comprises piston pump, such as the Viscount® 4-Ball piston pump commercially available from Graco Inc., Minneapolis, Minn. Spray guns 22A and 22B are lever actuated nozzles that are connected to cables 48A and 48B. Cables 48A and 48B are mechanically pulled by actuators 23. Actuators 23 comprise hydraulic cylinders that are pressurized to displace a piston. Actuators 23 use high pressure hydraulic fluid bled from between pumps 40 and 20. For example, inlet hose 53A provides high pressure fluid to actuator 23, while outlet hose 53B returns low pressure fluid to reservoir 44. Actuators 23 are activated using electric solenoids 24 that are powered and activated by controller 25. Actuators 23 and electric solenoids 24 comprise an electro-hydraulic actuation system of the present disclosure. Controller 25 includes push-button 49 (FIGS. 1A and 1B), or some other activation switch, that sends a signal from controller 25 to solenoids 24 to initiate activation of actuators 23, thus causing discharge of fluid from spray guns 22A and 22B. As shown in FIGS. 1A and 1B, push-button 49 is conveniently located within steering system 12.

Steering system 12, which includes handlebar 26 and speed bar 28 (FIGS. 1A and 1B), provides direct mechanical input to valve 50 and steering wheel 38. Specifically, cables 30A and 30B extend from handlebar 26 to steering wheel 38, while cable 46 extends between speed bar 28 and valve 50 on pump 40.

Returning to FIGS. 1A and 1B, in order to apply stripes, such as to pavement or an athletic field, the hydrostatic system is engaged to provide motive force to power wheels 36A and 36B. As such, stand-on line striper 10 rolls along the surface to which stripes are to be applied. With line striper 10 moving, an operator utilizes steering system 12 to control the speed and direction of line striper 10. Once the operator positions line striper 10 into a place where painted stripes are to be applied, paint system 19 is activated by controller 25. Steering system 12 allows the operator to control activation of paint system 19, the speed of line striper 10 and the direction of line striper 10 with easy to use, intuitive controls. Specifically, push-button 49 is connected to controller 25, which operates solenoids 24 to control actuators 23 and dispense paint at spray guns 22A and 22B, as is discussed with reference to FIGS. 3A-5.

Figure 3B:
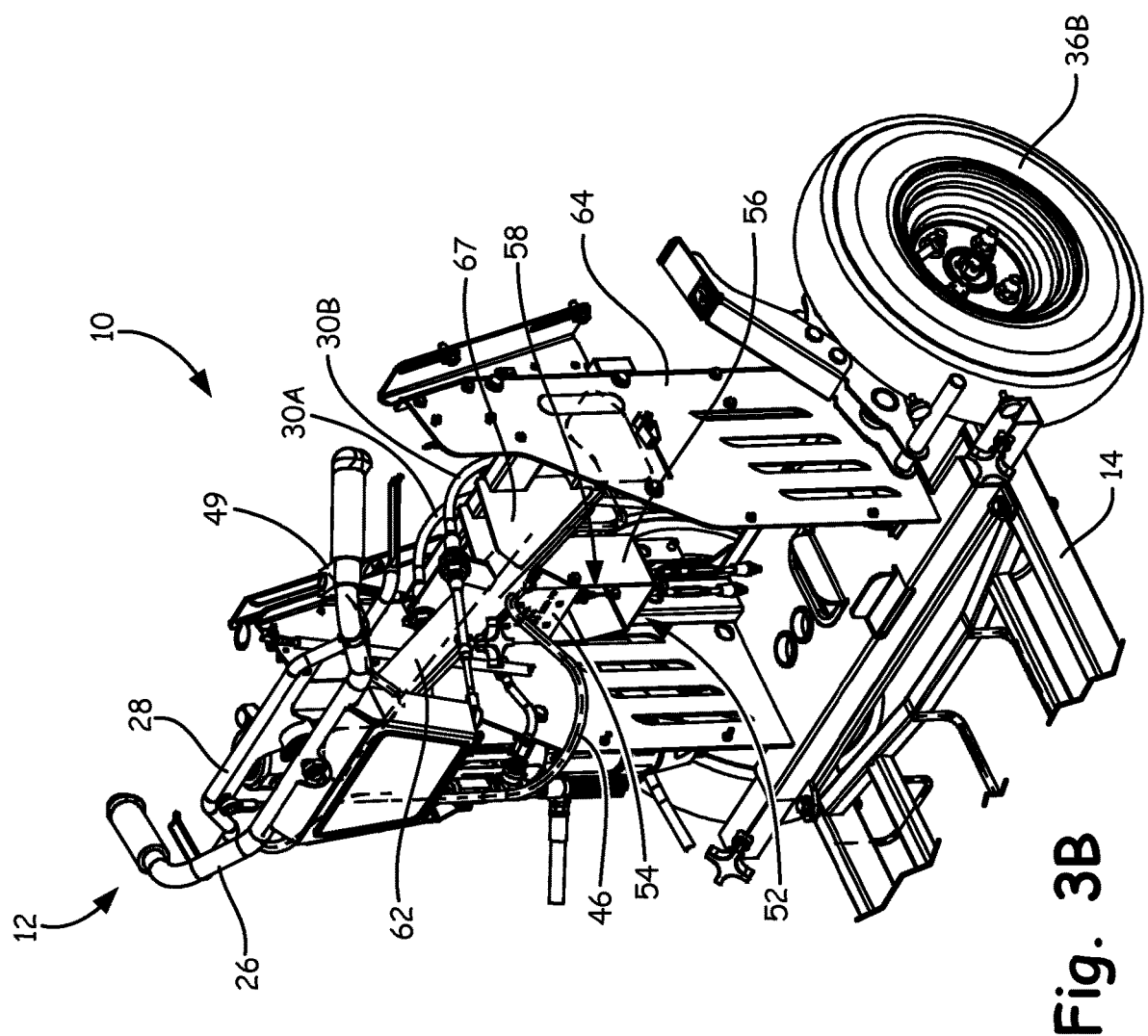

FIGS. 3A and 3B are perspective rear and front views, respectively, of stand-on line striper 10 of FIGS. 1A and 1B with parts of hydraulic system 18 (FIG. 1A) and paint system 19 (FIG. 1A) removed to show electro-hydraulic actuation system 52. Actuation system 52 includes manifold 54, bracket 56, solenoids 57 and actuators 58. FIGS. 3A and 3B are discussed concurrently.

Chassis 14 provides a frame upon which the various systems of line striper 10 and wheels 36A, 36B and 38 are mounted. In the embodiment shown, chassis 14 is fabricated from rectangular tubing bent into a rectilinear shape. Power wheels 36A and 36B are mounted proximate an aft end of chassis 14. In one embodiment, power wheels 36A and 36B are mounted directly onto shafts from motors 42 (FIG. 2). For example, power wheel 36A can be mounted onto a shaft from motor 42A, as shown in FIG. 3A. In other embodiments, power wheels 36A and 36B can be mounted onto spindles extending from chassis 14 and connected to motors 42 via gear systems.

Handlebar 26 and speed bar 28 are mounted on post 62, which is connected to chassis 14 through frame 64. Frame 64 provides a structure for mounting platform 60 (FIG. 1B) upon which an operator of line striper 10 may stand. In one embodiment, post 62 extends telescopically from stud 67 connected to frame 64 such that the height of handlebar 26 relative to platform 60 can be adjusted. Thus, an operator is positioned above power wheels 36A and 36B behind post 62, in position to grasp handlebar 26.

Post 62 provides pivot point 63 for handlebar 26. Pivot point 63 extends along axis A1, which extends generally perpendicularly to both the plane of chassis 14 and axis A2 along which power wheels 36A and 36B rotate. An operator of line striper 10 can rotate handlebar 26 about axis A1 to control the position of steering wheel 38 via cables 30A and 30B. Speed bar 28 is connected to handle bar 26 at pivot point 66. Pivot point 66 extends along axis A3, which extends generally parallel to the plane of chassis 14 and perpendicular to axis A2. Cable 46 extends from speed bar 28 to valve 50 that controls output of hydraulic pump 40 to hydraulic motors 42 (FIG. 2). Rotation of speed bar 28 in opposite directions causes forward or reverse movement of line striper 10. For example, rotation of speed bar 28 about axis A3 in a counter-clockwise direction from center (as depicted) causes valve 50 to route hydraulic fluid through motors 42 in a direction that causes forward movement of line striper 10, while rotation of speed bar 28 about axis A3 in a clockwise direction from center (as depicted) causes valve 50 to route hydraulic fluid through motors 42 in a direction that causes rearward movement of line striper 10.

Handlebar 26 additionally provides a convenient location for mounting push-button 49. Push-button 49 is electrically coupled to controller 25 (FIGS. 1B & 2) to operate paint system 19 (FIG. 1A), including pump 20 and spray guns 22A and 22B. Push-button 49 is located so that an operator of striper 10 need not remove his or her hands from handlebar 26 in order to initiate operation of paint system 19. In particular, an operator can set parameters of paint system 19 in controller 25 and subsequently, while driving striper 10 in a desired location, operate spray guns 22A and 22B (FIG. 1A) with push-button 49. Actuation system 52 provides rapid, on-off actuation of spray guns 22A and 22B using actuators 58 and solenoids 57. Actuators 58 are hydraulically driven by hydraulic system 18 and solenoids 57 are electrically controlled to operate actuators 58 via controller 25. Actuators 58 and solenoids 57 are mounted to frame 64 using manifold 54 and bracket 56, as are discussed in greater detail with reference to FIGS. 4A-5.

Figure 4A:
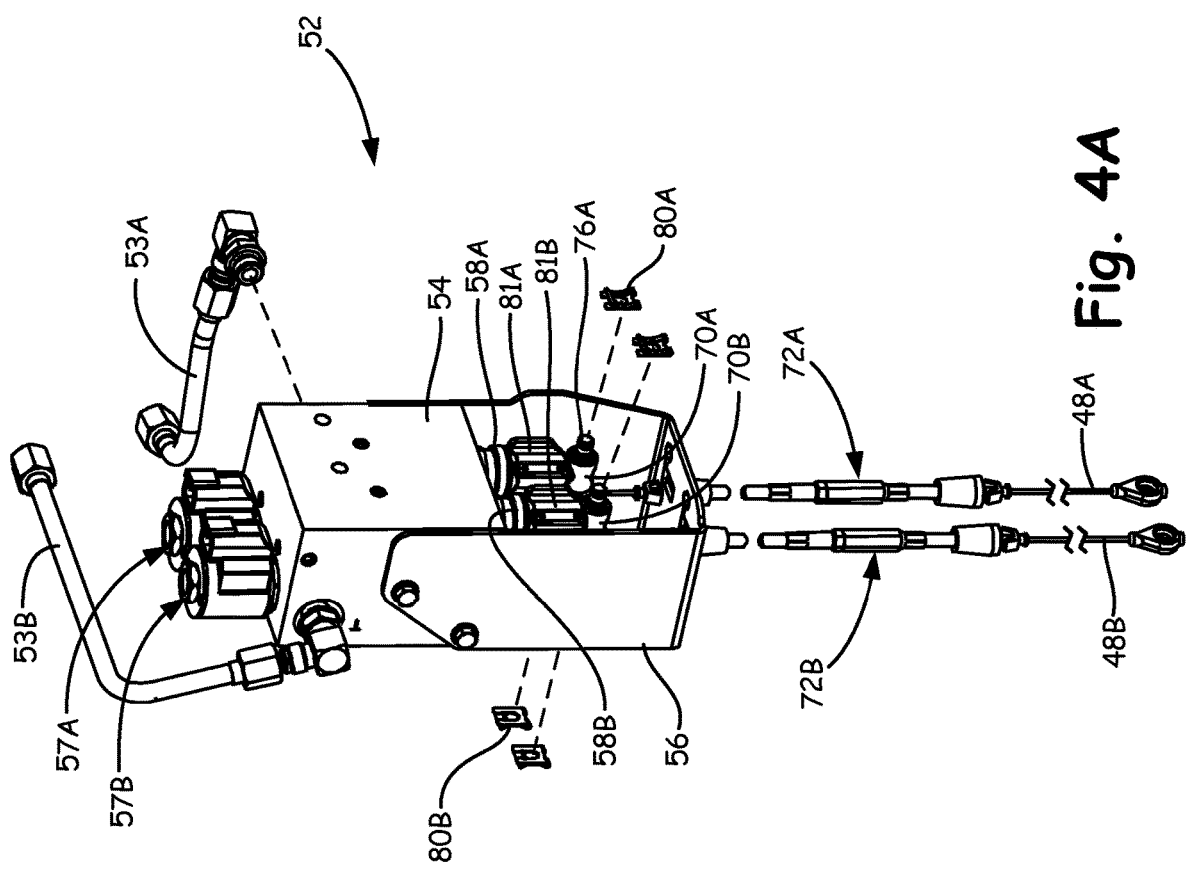
FIGS. 4A and 4B are perspective and exploded views, respectively, of the electro-hydraulic actuation system of FIGS. 3A and 3B showing a manifold connected to hydraulic actuators and electric actuators.
Figure 4B:
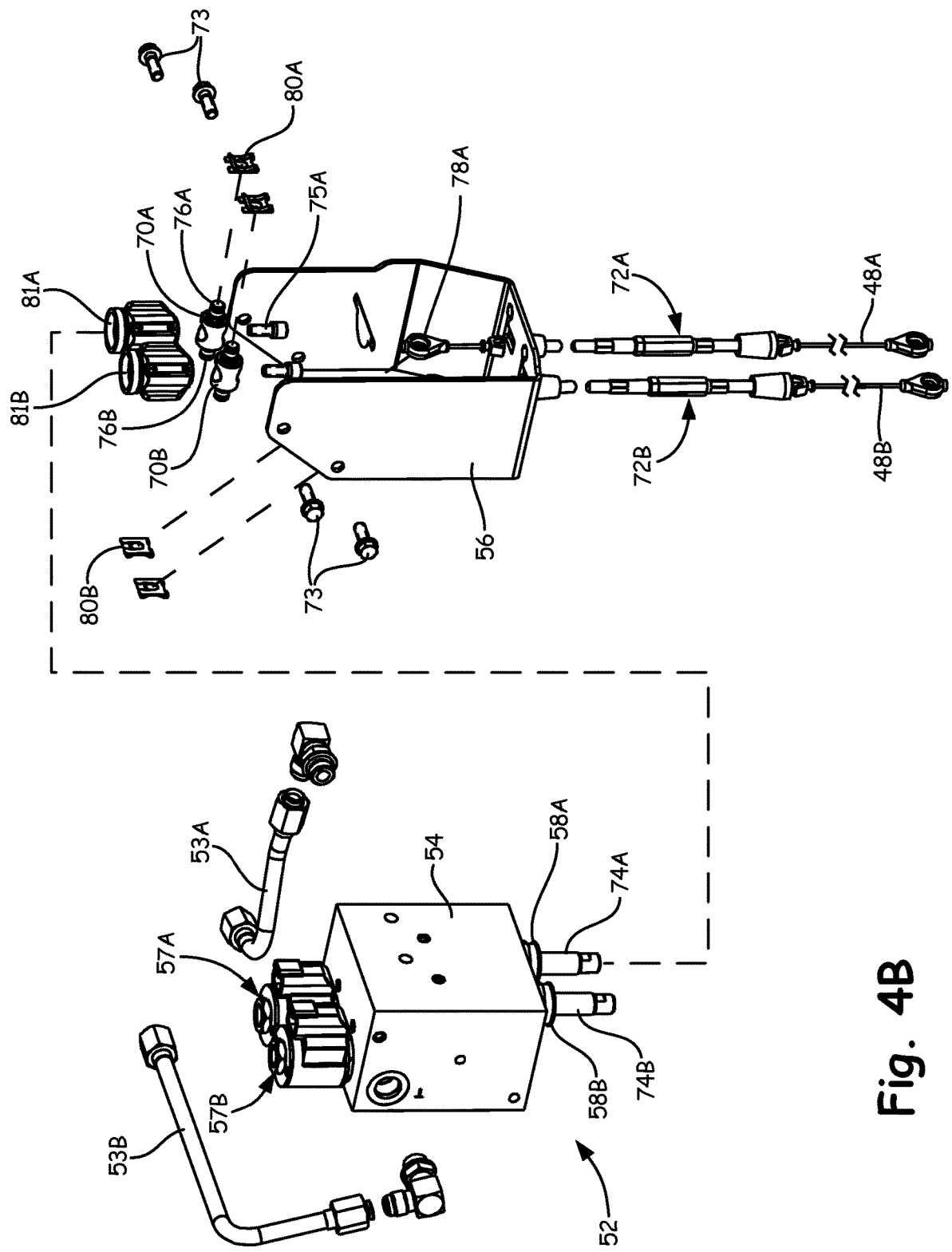

FIGS. 4A and 4B are perspective and exploded views, respectively, of electro-hydraulic actuation system 52 of FIGS. 3A and 3B showing manifold 54, bracket 56, solenoids 57A and 57B and actuators 58A and 58B. Actuation system 52 also includes cables 48A and 48B, inlet hose 53A, outlet hose 53B, couplers 70A and 70B and cable conduits 72A and 72B. FIGS. 4A and 4B are discussed concurrently.

Manifold 54 is mounted to frame 64 (FIG. 3A) of striper 10 (FIG. 1A) in a position conveniently accessible to hydraulic system 18 and paint system 19. Bracket 56 is connected to manifold 54 using fasteners 73. Hoses 53A and 53B are coupled to hydraulic fluid lines connecting hydraulic fluid pump 40 and paint pump 20. Inlet hose 53A connects to a high pressure, feed line, and outlet hose 53B connects to a low pressure, return line. Solenoids 57A and 57B are coupled to manifold 54 to interact with hydraulic fluid passing between inlet hose 53A and outlet hose 53B. Likewise, actuators 58A and 58B are coupled to manifold 54 so that pistons 74A and 74B (FIG. 4B) interact with the hydraulic fluid.

Couplers 70A and 70B are connected to pistons 74A and 74B and include multiple studs that enable each of pistons 74A and 74B to be connected to multiple linkages for actuating multiple paint guns. For example, coupler 70A is joined to piston 74A with fastener 75A, and includes studs 76A and 76B. Eye socket 78A is slipped over stud 76B and clip 80B secures eye socket 78A to coupler 70A. Eye socket 78A is connected to an extension cable that extends through an opening in bracket 56 to pass through cable conduit 72A. Cable 48A links directly to spray gun 22A (FIG. 1A). Cable conduit 72A includes a threaded stud that permits axial adjustment in its length, thereby altering the tension and slack in cable 48A. A second eye socket and cable assembly can be connected to stud 76A and an additional spray gun such that piston 74A can simultaneously actuate two spray guns. Clips 80A and 80B allow quick conversion between single and double spray gun operation. Using all the studs of couplers 70A and 70B, actuation system 52 can actuate up to four spray guns.

Pistons 74A and 74B slide in and out of manifold 54 via hydraulic fluid pressure. Boots 81A and 81B are positioned over pistons 74A and 74B to provide protection from dust, dirt, debris, etc. Pistons 74A and 74B include lands that react with pressurized hydraulic fluid to alternatively drive pistons 74A and 74B up or down, based on the position of solenoids 57A and 57B. For example, with solenoid 57A not activated, a plunger is positioned within manifold 54 so that high pressure hydraulic fluid from inlet hose 53A is routed to a first end of piston 74A and piston 74A is pushed downward (with reference to FIGS. 4A and 4B) so as to not displace cable 48A. When solenoid 57A is activated, a plunger is repositioned within manifold 54 to route high pressure hydraulic fluid from inlet hose 53A to a second end of piston 74A so that piston 74A is pushed upward (with reference to FIGS. 4A and 4B) so as to apply tension to cable 48A, thereby actuating spray gun 22A. Hydraulic fluid continues to run through manifold 54 so long as pump 40 (FIG. 2) is running and is returned to reservoir via outlet hose 53B. Cable conduits 72A and 72B can be adjusted to provide the proper amount of pre-tension in cables 48A and 48B so that actuation system 52 provides rapid activation of spray guns 22A and 22B.

Figure 5:
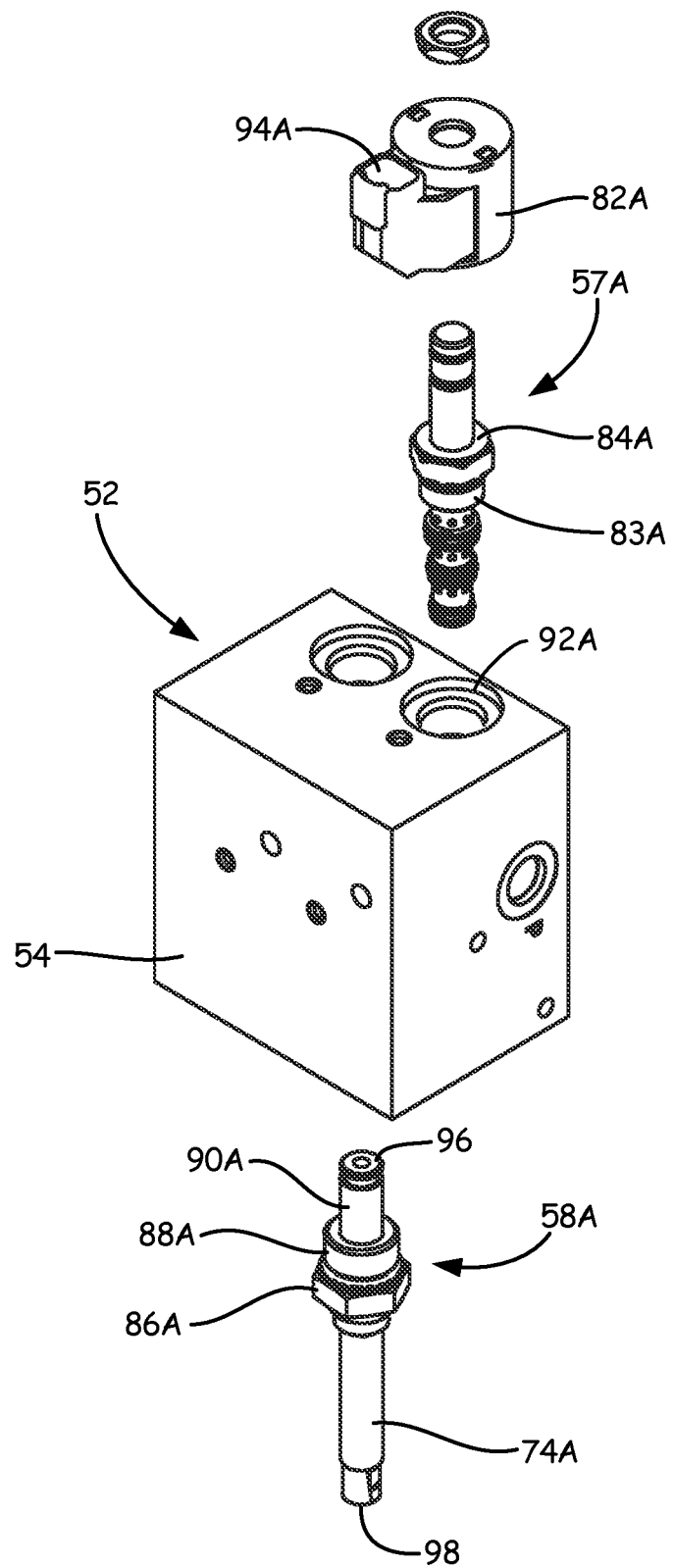
FIG. 5 is an exploded view of the actuation system of FIG. 4B showing a hydraulic piston and an electric plunger exploded from the manifold.

FIG. 5 is an exploded view of actuation system 52 of FIG. 4B showing hydraulic actuator 58A and electric solenoid 57A exploded from manifold 54. Hydraulic actuator 58B and electric solenoid 57B (FIGS. 4A & 4B) are not shown in FIG. 5 for clarity. Solenoid 57A includes coil 82A, housing 83A and spool valve 84A. Hydraulic actuator 58A includes piston 74A, housing 86A, land 88A and land 90A.

Housing 83A of solenoid 57A is threaded into socket 92A in manifold 54 so as to intersect fluid pathways (not shown) between inlet hose 53A and outlet hose 53B. Housing 83A includes various bores that permit hydraulic fluid to pass through housing 83A. Spool valve 84A is inserted into housing 83A and coil 82A is positioned around spool valve 84A. Coil 82A is electrically activated, such as by connection to controller 25 (FIG. 2) by an electrical connection at socket 94A, to displace spool valve 84A, as is known in the art. Spool valve 84A thus moves to cover and uncover various bores in housing 83A. As spool valve 84A moves, piston 74A of actuator 58A is displaced via flow of hydraulic fluid through manifold 54.

Housing 86A of actuator 58A is threaded into a socket (not shown) in manifold 54. Piston 74A extends though housing 86A so as to intersect fluid pathways inside manifold 54 at first end 96. Second end 98 of piston 74A extends out of manifold 54 so as to facilitate connection to coupler 70A (FIG. 4B). Land 88A prevents hydraulic fluid from passing out of housing 86A. Piston 74A is, however, free to move within housing 86A.

For the described embodiment, when spool valve 84A is in a down position (fully inserted into manifold 54), high pressure hydraulic fluid is directed to first end 96 at land 90A to force piston 74A down via passage of the hydraulic fluid through appropriate bores in housing 83A. Thus, cable 48A (FIG. 4B) remains sufficiently slack to not activate spray gun 22A (FIG. 1A). Solenoid 57A may include a spring to bias spool valve 84A to down position, for example, in an un-activated state. When an appropriate electrical signal is provided to socket 94A, coil 82A is activated to move spool valve 84A in housing 83A, uncovering different bores in housing 83A. Thus, when spool valve 84A is in an up position (withdrawn from manifold 54), high pressure hydraulic fluid is directed to the underside of land 88A to force piston 74A up via passage of the hydraulic fluid through appropriate bores in housing 83A. Thus, cable 48A is put into tension and displaced to mechanically trip a lever controlling flow of fluid through a valve in spray gun 22A.

High pressure hydraulic fluid is directed to piston 74A for both activated and un-activated states of solenoid 57A. Actuation system 52 does not rely on a pressure drop in manifold 54 to stop dispensing at spray gun 22A. Instead, actuation system 52 actively moves piston 74A in both directions. Thus, piston 74A rapidly responds to both states, which leads to precise and accurate control of the striping process by controller 25. Controller 25 and actuation system 52 additionally increase the precision and accuracy of the striping process by automating the activation process, which is manually controlled in conventional, prior art systems. Furthermore, actuation system 52 is incorporated into a hydraulic system within the line striping system, thereby reducing the need for additional, dedicated components for the paint system, such as an air compressor. Push-button 49 (FIG. 1A) provides a user-friendly means of commanding controller 25 when to activate solenoids 57A and 57B to commence painting operations.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A line striping system comprising:
a chassis;
a wheel mounted to the chassis;
a steering system comprising a handlebar that is operably connected to the wheel and configured to be manually rotated relative to the chassis by a user to turn the wheel relative to the chassis;
a spray system mounted on the chassis, the spray system comprising:
a spray gun having a lever, the spray gun positioned for ground spraying; and
a fluid pump that provides pressurized fluid to the spray gun;
an electrically controlled actuation system connected to the spray system, the electrically controlled actuation system comprising:
an actuator supported on the chassis, the actuator comprising a solenoid; and
a cable connected between the actuator and the lever of the spray gun, so that activation of the solenoid causes the cable to be pulled to move the lever to actuate the spray gun to spray;
a controller supported by the chassis and electrically connected to the solenoid, wherein the controller is configured to electrically activate the solenoid; and
an activation switch mounted on the handlebar of the steering system to be manually rotated with the steering system relative to the chassis during steering, the activation switch in communication with the controller, the activation switch hand operated to cause the controller to electrically activate the solenoid to cause spraying from the spray gun.

2. The line striping system of claim 1, wherein the actuator comprises:
a piston connected to the cable and driven in first and second directions by a hydraulic system, the solenoid controlling flow of hydraulic fluid to the piston.

3. The line striping system of claim 2, wherein:
the electronically controlled actuation system further comprises a manifold that couples the piston and the solenoid; and
the solenoid comprises:
a plunger extending into the manifold to control flow to the piston; and
an electric coil for actuating the plunger.

4. The line striping system of claim 3, wherein:
the controller is coupled to the electric coil; and
the activation switch is connected to the controller and is capable of sending an electrical signal to the electric coil.

5. The line striping system of claim 2, wherein the hydraulic system comprises:
a hydraulic pump for pressurizing the hydraulic fluid; and
a hydraulic motor for driving the wheel.

6. The line striping system of claim 5, wherein the fluid pump is powered by the hydraulic fluid.

7. The line striping system of claim 2, wherein the hydraulic system is mounted on the chassis and powers the wheel and the spray system.

8. The line striping system of claim 1, wherein the controller includes a push-button configured to send a signal from the controller to the actuator.

9. The line striping system of claim 1, wherein the cable is mechanically linked to a piston of the actuator.

10. The lines striping system of claim 9, further including couplers for connecting cables from multiple spray guns to the piston.

11. A line striping system comprising:
a spray system comprising:
a first spray gun having a first lever;
a second spray gun having a second lever;
a fluid pump that provides pressurized fluid to the first spray gun and the second spray gun;
an electrically controlled actuation system connected to the spray system, the electrically controlled actuation system comprising:
a first actuator supported on a chassis of the line striping system;
a first cable that is connected between the first actuator and the first spray gun, so that activation of the first actuator causes the first cable to actuate the first lever of the first spray gun;
a second actuator supported on the chassis; and
a second cable that is connected between the second actuator and the second spray gun, so that activation of the second actuator causes the second cable to actuate the second lever of the second spray gun;

a controller electrically connected to the first actuator and supported on the chassis, wherein the controller is configured to cause the first actuator to actuate the first lever of the first spray gun via the first cable and is configured to cause the second actuator to actuate the second lever of the second spray gun via the second cable, based on striping parameters set at the controller; and an activation switch electrically connected to the controller to activate and deactivate the controller and configured to be mounted on a handlebar of the line striping system;

wherein the controller is operably connected to the first actuator, the second actuator, and the activation switch such that the controller can, based on the striping parameters, cause the first actuator to actuate the first lever separate from the second actuator actuating the second lever, cause the second actuator to actuate the second lever separate from the first actuator actuating the first lever, and cause the first actuator to actuate the first lever simultaneously with causing the second actuator to actuate the second lever.

12. The line striping system of claim 11, wherein the first actuator includes a first solenoid.

13. A line striping system comprising:
a chassis;
a plurality of wheels mounted to the chassis to allow the chassis to roll;
a handlebar;
a spray system supported by the chassis, the spray system comprising:
    one or more lever actuated spray guns positioned for painting stripes on the ground by spraying and controllable between a spray state and a non-spray state, the one or more lever actuated spray guns configured to emit paint for painting stripes while in the spray state; and
    a fluid pump that provides paint under pressure to the one or more lever actuated spray guns;
an electrically controlled actuation system supported by on the chassis, the actuation system comprising:
    an actuator mounted on the chassis, the actuator comprising one or more electric solenoids;
    a controller supported on the chassis and coupled to the actuator;
    an activation switch mounted on the handlebar and electrically connected to the controller to cause the controller to electrically activate the one or more electric solenoids, the activation switch actuatable between an activated state and a deactivated state; and
    one or more cables extending from the actuator and linked to the one or more lever actuated spray guns, wherein actuation of the activation switch to the activated state causes activation of the one or more solenoids which causes actuation of the actuator which causes the one or more cables to be pulled by the electrically controlled actuation system sufficient to actuate the one or more lever actuated spray guns to spray one or more stripes on the ground;
wherein the controller is configured to cause the one or more lever actuated spray guns to switch between the spray state and the non-spray state with the activation switch in the activated state.

14. The line striping system of claim 13, further comprising:
a hydraulic system mounted on the chassis and including a hydraulic pump supported by the chassis, wherein the hydraulic system powers the spray system.

15. The line striping system of claim 14, wherein the hydraulic pump is configured to pressurize a hydraulic fluid; and
the hydraulic system comprises a hydraulic motor for driving a wheel of the plurality of wheels.

16. The line striping system of claim 15, wherein the fluid pump is powered by the hydraulic fluid.

17. The line striping system of claim 1, wherein the activation switch is a push-button.

18. The line striping system of claim 1, wherein the controller is configured to electrically activate the solenoid based on striping parameters set at the controller.

* * * * *